United States Patent
Sassi et al.

(10) Patent No.: US 7,036,974 B2
(45) Date of Patent: May 2, 2006

(54) MIXING DEVICE FOR EXTRUDERS

(75) Inventors: Dario Ivan Sassi, Gorla Minore (IT); Francesco Sant'elia, Varese (IT)

(73) Assignee: M.R.S. Italia S.R.L., (IT)

( * ) Notice: Subject to any disclaimer, the term of this patent is extended or adjusted under 35 U.S.C. 154(b) by 333 days.

(21) Appl. No.: 10/453,956

(22) Filed: Jun. 4, 2003

(65) Prior Publication Data
US 2004/0179425 A1 Sep. 16, 2004

(30) Foreign Application Priority Data
Mar. 13, 2003 (EP) .................................. 03425153

(51) Int. Cl.
*B29B 7/42* (2006.01)

(52) U.S. Cl. ....................................................... 366/81
(58) Field of Classification Search ............ 366/79–90, 366/319, 321–324; 425/204, 208, 209
See application file for complete search history.

(56) References Cited

U.S. PATENT DOCUMENTS

| | | | | |
|---|---|---|---|---|
| 3,652,064 A | * | 3/1972 | Lehnen et al. ................. | 366/88 |
| 3,701,512 A | | 10/1972 | Schippers, et al. | |
| 3,941,535 A | * | 3/1976 | Street .......................... | 425/208 |
| 4,171,196 A | * | 10/1979 | Maillefer ..................... | 425/209 |
| 4,752,136 A | * | 6/1988 | Colby ........................... | 366/89 |
| 5,056,925 A | | 10/1991 | Klein | |
| 5,064,293 A | * | 11/1991 | Nakamura .................... | 366/324 |
| 5,215,764 A | * | 6/1993 | Davis et al. ................. | 425/208 |
| 5,318,357 A | | 6/1994 | Colby et al. | |
| 5,798,077 A | * | 8/1998 | Womer et al. ................. | 366/81 |
| 5,816,698 A | * | 10/1998 | Durina et al. ................. | 366/81 |
| 6,136,246 A | | 10/2000 | Rauwendaal et al. | |
| 6,497,508 B1 | * | 12/2002 | Womer et al. ................. | 366/81 |
| 2004/0179425 A1 | * | 9/2004 | Sassi et al. .................... | 366/81 |
| 2004/0257904 A1 | * | 12/2004 | Zhang et al. ................. | 366/81 |

FOREIGN PATENT DOCUMENTS

| | | | |
|---|---|---|---|
| JP | 55-28868 | * | 2/1980 |
| JP | 57-80037 | * | 5/1982 |

OTHER PUBLICATIONS

European Search Report for companion case, No. EP 03 42 5153.
European Examination Report for companion case, No. EP 03 42 5153.

* cited by examiner

*Primary Examiner*—Charles E. Cooley
(74) *Attorney, Agent, or Firm*—James B. Conte; Barnes & Thornburg LLP (57) ABSTRACT

A mixing device comprises a cylindrical body (14) to be terminally engaged with an extrusion screw (2) and carrying at least one primary mixing thread (15) and at least one secondary mixing thread (16) having a crest diameter ($d_3$) smaller than the crest diameter ($d_1$) of the primary mixing thread (15). The primary mixing thread (15) has a helical extension in the same direction as that of the secondary mixing thread (16), to delimit at least one primary flow channel (17) and at least one secondary flow channel (18) that are substantially parallel. The primary mixing thread (15) further has, on its crest (19), communication grooves (20) between the primary (17) and secondary (18) flow channels.

94 Claims, 3 Drawing Sheets

MIXING DEVICE FOR EXTRUDERS

BACKGROUND OF THE INVENTION

The present invention relates to a mixing device for extruders comprising a substantially cylindrical body to be terminally engaged with an extrusion screw having a shank and a transportation thread helically wound on the shank; and at least one primary mixing thread helically wound at least partly around the substantially cylindrical body in a predetermined winding direction and having a predetermined crest diameter.

1. Field of the Invention

It is known that in the plastic-material field as regards working and production of articles of manufacture, rotating-screw extruders are used into which the plastic material in granular form is introduced to obtain a compound at the exit which is adapted for subsequent drawing or injection operations in appropriate die-casting molds or others. In many cases the extruder is part of a so-called "plasticizing unit" directly connected to a mold, a rolling set or other type of device for shaping or forming the plastic material delivered from the extruder.

2. Description of the Prior Art

Extruders consist of a cylindrical body within which a screw is axially mounted which is set in rotation by appropriate motors. The bottom diameter of the screw thread grows along the axial extension of the screw starting from an inlet opening towards an outlet opening; in addition the cylinder walls are provided with appropriate heating resistances. The material moving forward in the race of the screw thread is submitted to temperature and pressure rise as needed for obtaining the required physical properties.

One of the main problems typical of the extrusion screws of the traditional type is an insufficient homogeneity of the material that adversely affects the final product obtained by drawing or molding.

For example, since heat is supplied through the cylinder walls, the presence of a temperature variation in the thickness of the material included between the screw web and the inner wall of the cylinder has been noticed. This temperature variation corresponds to a variation in the density of the material itself. Density variation in the material may give rise to an inhomogeneous distribution of the material in the mold, for example.

In addition, the polymer molecules composing each resin tend to remain mutually connected to form the so-called "memory lattices" in which the polymer molecules keep mutually bonded giving the compound a clotty appearance, in which small compact material clusters immersed in a more fluid current are identifiable.

Finally, when resins of different color and nature are processed, an incomplete mixing of same leads to production of articles of manufacture in which regions of different color are recognizable due to the prevalence of a resin with respect to the other.

To partially solve the above problems, extrusion screws are known that are provided, at the screw end close to the outlet, with a mixing device the function of which is to improve homogeneity of the material and make temperature distribution more uniform.

For example, document U.S. Pat. No. 5,318,357 shows an extrusion screw having a mixing portion provided with a plurality of helical primary threads interrupted at intervals along the extension of same. The distinct threads are mutually connected by plates circumferentially extending around the screw web and defining regions of reduced depth in the races confined by the primary threads.

The Applicant has found that the mixing level reached by the devices of the known art can be further improved.

SUMMARY OF THE INVENTION

Accordingly, it is an aim of the present invention to propose a mixing device for extruders ensuring a high homogeneity of the material coming out of the extrusion cylinder.

In more detail, it is an aim of the present invention to propose a mixing device for extruders enabling an optimal plasticization of the material to be obtained without increasing the cylinder temperature too much.

It is a further aim of the invention to provide a mixing device for extruders optimizing the resin mixing by reducing the memory lattices of the polymers composing the resins.

The foregoing and further aims that will become more apparent in the progress of the following description are substantially achieved by a mixing device for extruders comprising at least one secondary mixing thread helically wound at least partly around the substantially cylindrical body in the same direction as said predetermined winding direction and having a crest diameter smaller than the crest diameter of the primary mixing thread; said at least one primary mixing thread delimiting at least one primary flow channel and at least one secondary flow channel that are substantially parallel; said at least one primary mixing thread further having at least one communication groove on its crest between the respective primary flow channel and the respective secondary flow channel.

BRIEF DESCRIPTION OF THE DRAWINGS

Further features and advantages will be best understood from the detailed description of a preferred but not exclusive embodiment of a mixing device for extruders in accordance with the present invention. This description will be set out hereinafter with reference to the accompanying drawings, given by way of non-limiting example, in which.

DESCRIPTION OF THE PREFERRED EMBODIMENT

Referring in particular to the above drawings, a mixing device for extruders in accordance with the present invention has been generally identified by reference numeral 1.

Device 1 is coaxially mounted on an extrusion screw 2, preferably at an outlet end 3 thereof for material exit. Screw 2 is installed in a tubular body of known type only partly illustrated in FIG. 1 and is set in rotation by appropriate drive means, not shown. The screw 2, tubular body 4 and drive means all together define an extrusion apparatus or extruder 5.

Figure 1:
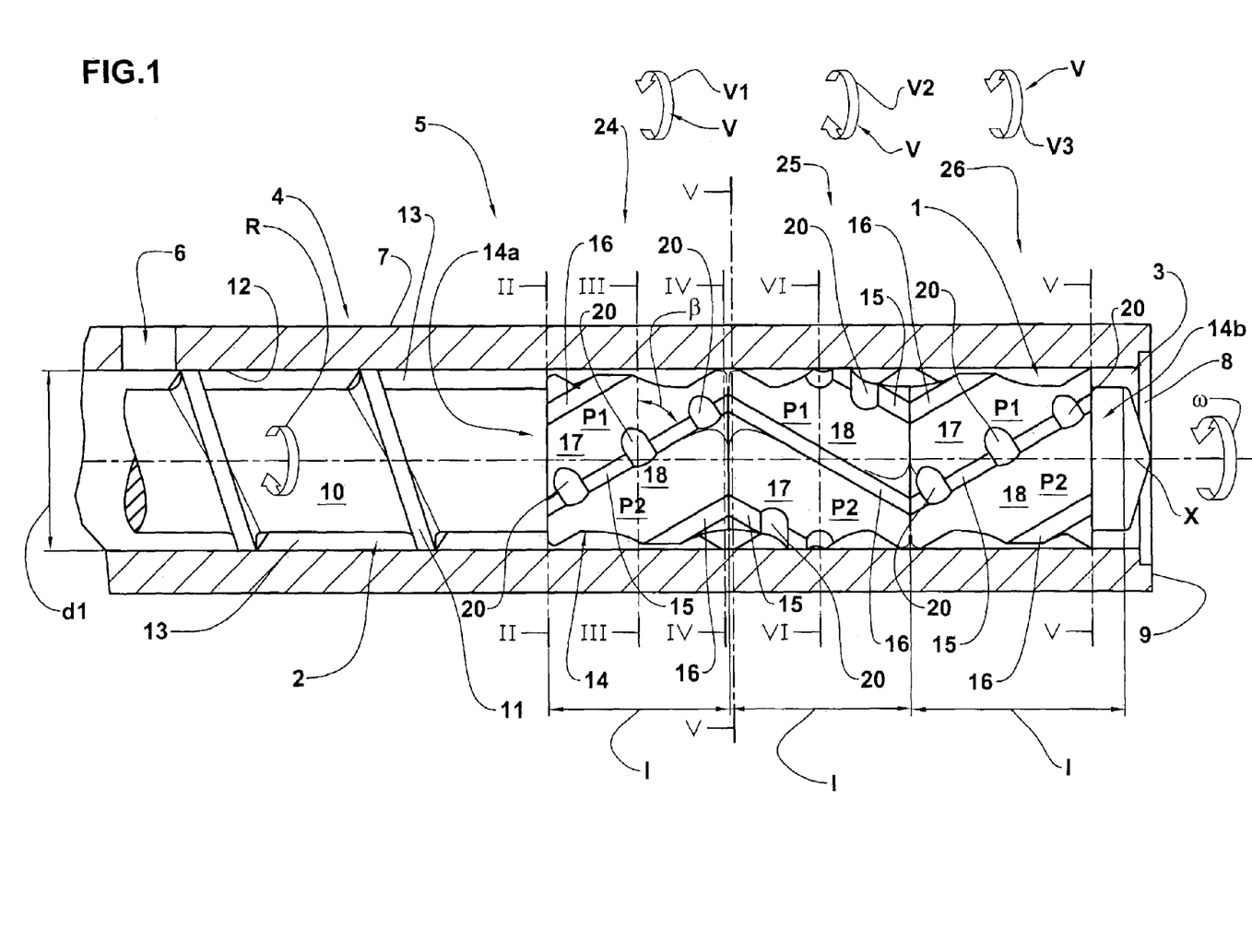
FIG. 1 is an elevation side view partly in section of a screw extruder comprising a mixing device in accordance with the present invention.

Extruder 5 has an inlet opening 6, formed in a side wall 7 of the tubular body 4 and diagrammatically shown in FIG. 1, and an outlet opening 8 formed in a base 9 of the tubular body 4, at the outlet end 3 of screw 2. The tubular body 4 is further provided with appropriate heating elements, not shown, preferably defined by one or more resistances buried in the thickness of the body 4 itself.

Screw 2 extends between the inlet 6 and outlet 8 and has the function of moving the admitted material towards the outlet while submitting it to a temperature and pressure rise.

Screw 2 comprises a shank 10 or web, and a transportation thread 11 helically wound on the shank 10 in a predetermined direction R. The outer diameter $Ad_1$" of the transportation thread 11 is substantially the same as the inner diameter of the tubular body 4, apart from possible clearances required for free rotation of the screw 2 in the cylinder 4 itself.

As clearly shown in FIG. 1, the transportation thread 11, shank 10 and inner surface 12 of the wall 7 of the tubular body 4 delimit a fixed helical path 13 for the plastic material.

In addition, shank 10 has an increasing diameter from the inlet opening 6 to the outlet opening 8 to progressively reduce the passage section of the fixed helical path 13 and force the plastic material to mixing.

In more detail, the mixing device 1 comprises a substantially cylindrical body 14 coaxial with screw 2 and in engagement, preferably at an end position close to outlet 3, with the screw 2 itself.

In the preferred embodiment herein illustrated, device 1 forms an element of one piece construction with screw 2, but in alternative embodiments not shown it could be made as a separated part to be subsequently mounted in screw 2 in a movable or irremovable manner.

Device 1 has at least one primary mixing thread 15 and at least one secondary mixing thread 16 helically wound around the cylindrical body 14 in a predetermined winding direction V. The mixing threads 15, 16 extend from an inlet end 14a of the cylindrical body 14 facing the extrusion screw 2 to an outlet end 14b of the cylindrical body 14 itself, which faces the outlet opening 8 of the tubular body 4. In addition, the two threads 15, 16 extend substantially parallel and delimit at least one primary flow channel 17 and at least one secondary flow channel 18 between them, said channels being substantially parallel and being helically wound around the cylindrical body 14 in the predetermined direction V.

Preferably, the device comprises a plurality of primary mixing threads 15 and a plurality of secondary mixing threads 16 disposed in an alternate sequence along the circumferential extension of the cylindrical body 14.

The preferred embodiment illustrated in the accompanying figures in particular comprises a device 1 provided with three primary mixing threads 15a, 15b, 15c and three secondary mixing threads 16a, 16b, 16c forming three primary flow channels 17a, 17b, 17c and three secondary flow channels 18a, 18b, 18c.

The mixing threads 14, 15 have a different pitch than the pitch of the transportation thread 11 of screw 2, advantageously a larger pitch than the pitch of screw 2 and are only partly wound around the cylindrical body 14.

Advantageously, each of the primary mixing threads 15 has a crest 19 of a constant maximum diameter "d2" equal to the crest diameter "d1" of the extrusion screw 2. In this way, as shown in FIGS. 2, 3, 4, 5 and 6, the primary thread 15 substantially runs in contact with the inner surface 12 of the tubular body 4, to prevent passage of plastic material along the whole extension of the crest 19 of the primary thread. In addition, one or more grooves 20 are formed in the crest 19 of each primary mixing thread 15 to bring the respective primary flow channel 17 and the respective secondary flow channel 18 into communication with each other and provide the plastic material with a fixed passage path between the two channels 17, 18. Grooves 20 extend transversely of the respective crest 19, preferably in a direction perpendicular to the extension of the crest 19 itself.

Grooves 20 further have a bottom surface 21, seen in a section transverse to the longitudinal axis X of screw 2 (FIGS. 3 and 6) and shaped in the form of an arched profile with a depth "h1" of smaller amount than the depth of the flow channels 17, 18, and included, just as an indication, between 20% and 90% of the channel depth.

Each of the secondary mixing threads 16 has a maximum diameter "d3" of crest 22 smaller than the crest diameter "d1" of the thread 11 of the extrusion screw 2, to leave a passage port 23 between the secondary thread 16 and the inner surface 12 of the tubular body 4 (FIGS. 2–5). The height "h2" of the passage port 23 is preferably included between 0.5 mm and 5 mm, in the order of approximately 1.5 mm for example, for a crest diameter "d1" of 80 mm.

The primary and secondary channels, 17 and 18 delimited by the mixing threads 15, 16 seen in cross-section have an arched-profile shape the concavity of which faces away from the longitudinal axis X of screw 2.

Advantageously, each of the primary flow channels 17 has a bottom diameter "d4" increasing from the inlet end 14a to the outlet end 14b of the cylindrical body 14. The depth "h3" of the primary flow channels 17, measured with respect to the diameter "d2" of crest 19 of the primary mixing threads 15 decreases towards the outlet 8 of the tubular body 4.

In addition, each of the primary channels 17 is put downstream of the respective primary mixing thread 15 with respect to a predetermined rotation direction assigned to the cylindrical body 14, which is of the same direction as the rotation direction "ω" (FIG. 1) of screw 2 and is opposite to the winding direction R of thread 11.

Each of the secondary flow channels 18 has a decreasing bottom diameter "d5" from the inlet end 14a to the outlet end 14b of the substantially cylindrical body 14. Therefore, the depth "h4" of the secondary flow channels 18 increases towards the outlet 8 of the tubular body 4.

In addition, each of the secondary channels 18 is put upstream of the respective primary mixing thread 15, with respect to a rotation direction assigned to the cylindrical body 14.

The maximum value of depths "h3" and "h4" of both the primary channels 17 and secondary channels 18 is preferably included between ⅕ and 1/20, and more preferably is of about 1/10, of the outer diameter "d1" of the extrusion screw. The minimum value of depths "h3" and "h4" of the primary channels 17 and secondary channels 18 is in turn included between ⅓ and ⅔, and preferably is of about ½, of said maximum value.

The winding direction $V_1$, $V_2$, $V_3$ of the primary and secondary mixing threads, 15 and 16, and consequently of the primary 17 and secondary 18 channels as well, can be in the same direction or in the opposite direction with respect to the winding direction R of the transportation thread 11 on the extrusion screw 2.

Preferably and advantageously, the cylindrical body 14 has a first 24, second 25 and third 26 portions disposed consecutively in succession along the longitudinal axis X of screw 2 which is coincident with the rotation axis of the cylindrical body 14. The winding direction $V_2$ of threads 15, 16 in the stretches disposed on the second portion 25 is opposite to the winding directions $V_1$, $V_3$ of the stretches of threads 15, 16 on the first and third portion 24, 26. In addition, in the stretch of the primary thread 15 associated with each of the portions 24, 25, 26, at least two, and preferably three, passage grooves 20 are arranged and they are spaced apart the same distance from each other.

In more detail, the first portion 24 is placed at the inlet end 14a of the cylindrical body 14 and has a winding direction $V_1$ of its mixing threads 15, 16 opposite to the winding direction R of the transportation thread 11 of the extrusion screw 2. In the embodiment shown, the transportation thread 11 is wound clockwise from the inlet 6 to the outlet 8 of the extruder 5 whereas the mixing threads 15, 16 of the first portion 24 are wound counterclockwise.

The winding direction $V_2$ of the threads 15, 16 of the second portion 25 disposed in axial side by side relationship with the first portion 24, is in the same direction as the winding direction R of the transportation thread 11 and opposite to the winding direction $V_1$ of the threads 15, 16 of the first portion 24.

Finally, the mixing threads 15, 16 of the third portion 26 extend in a winding direction $V_3$ opposite to the winding direction R of the transportation thread 11 and therefore equal to the winding direction $V_1$ of the first portion 24.

As shown in the accompanying figures, each portion 24, 25, 26 has an axial length "l" substantially equal to the outer diameter "d1" of the transportation thread 11, and at all events preferably included between 0.5 and 1.5 times the crest diameter "d3" of the primary threads 15.

Figure 2:
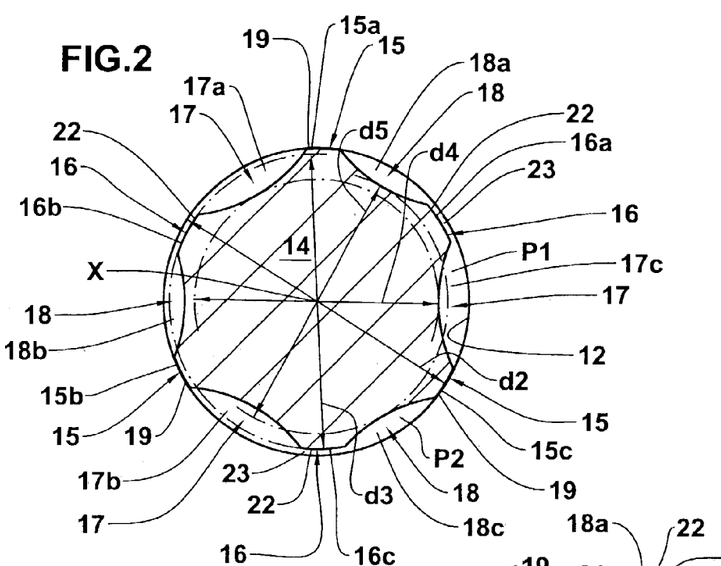
FIG. 2 is a cross-sectional view of the device in accordance with the present invention, taken along line II—II in FIG. 1.
Figures 3, 4:
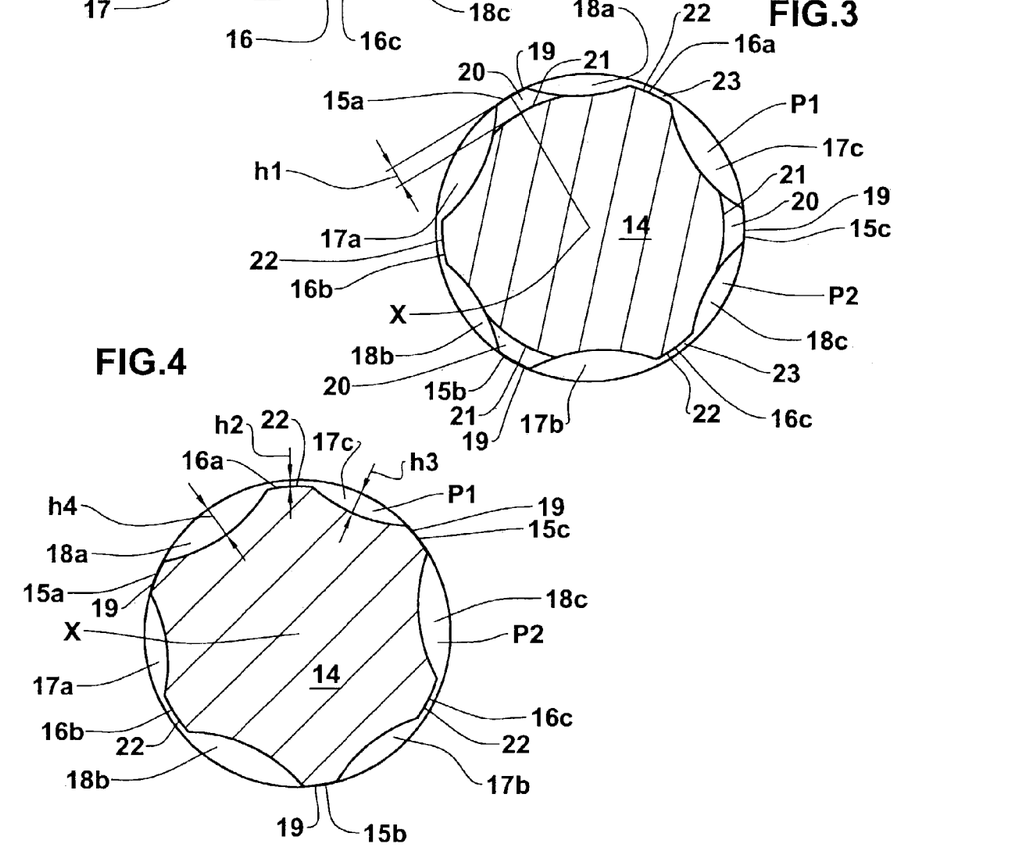
FIG. 3 is a cross-sectional view of the device in accordance with the present invention, taken along line III—III in FIG. 1.
FIG. 4 is a cross-sectional view of the device of the invention, taken along line IV—IV in FIG. 1.

Preferably the mixing threads 15, 16 are only partly wound around the cylindrical body 14. In particular, each of the primary 15 and secondary 16 threads is wound on the respective portion 24, 25, 26 according to an arc that, around the rotation axis of the cylindrical body 14, subtends an angle included between 45° and 180°, preferably of 60°. The primary 17 and secondary 18 channels as well are wound following the same angular opening. In fact, taking into consideration the primary channel 17c corresponding, as shown in FIG. 2, to the inlet cross-section of the first portion 24 of the cylindrical body 14, and, as shown in FIG. 4, to the outlet cross-section of the first portion 24, it is possible to see that the channel is wound counterclockwise at an angle equal to about 60°.

In addition, each of the primary 15 and secondary 16 threads is inclined to a plane orthogonal to the rotation axis X of the cylindrical body 14 at an angle "β" (FIG. 1) included between 30° and 80°, preferably of 60°.

Advantageously, each stretch of the primary mixing thread 15 belonging to the second portion 25 is terminally joined, at each of its opposite ends, to a respective stretch of one of the secondary mixing threads 16 belonging to the first portion 24 and/or the third portion 26. In turn, each stretch of the secondary mixing thread 16 disposed on the second portion 25 is terminally joined, at each of its opposite ends, to a respective stretch of one of the primary mixing threads 15 belonging to the first portion 24 and/or the third portion 26.

In addition, it appears that the stretch of each primary flow channel 17 disposed on the second portion 25 terminally joins a respective stretch of the secondary flow channel 18 associated with the first portion 24 and the second portion 26. The secondary flow channels 18 on the second portion 25 in turn join the respective primary flow channels 17 disposed on the first portion 24 and third portion 26.

Figure 5:
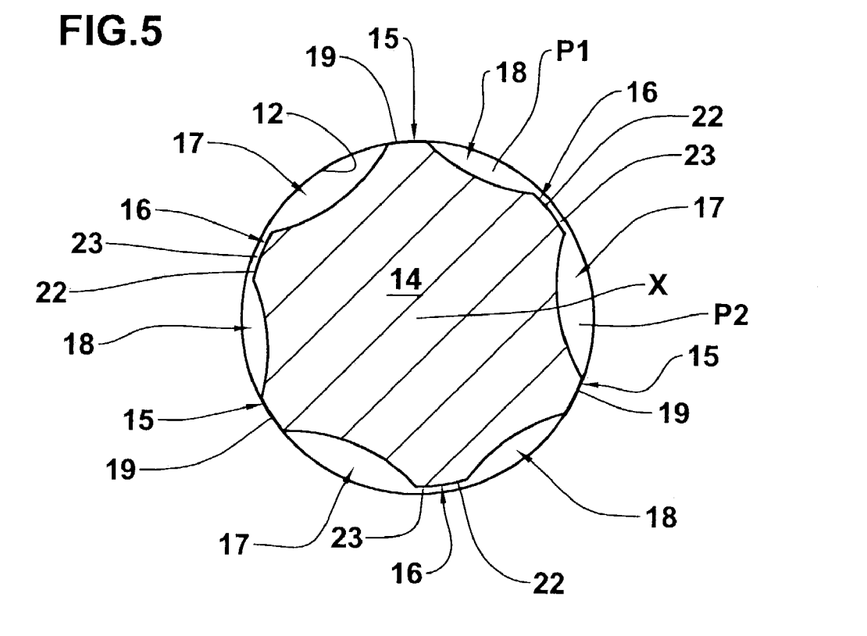
FIG. 5 is a cross-sectional view of the device of the invention taken along line V—V in FIG. 1.
Figure 6:
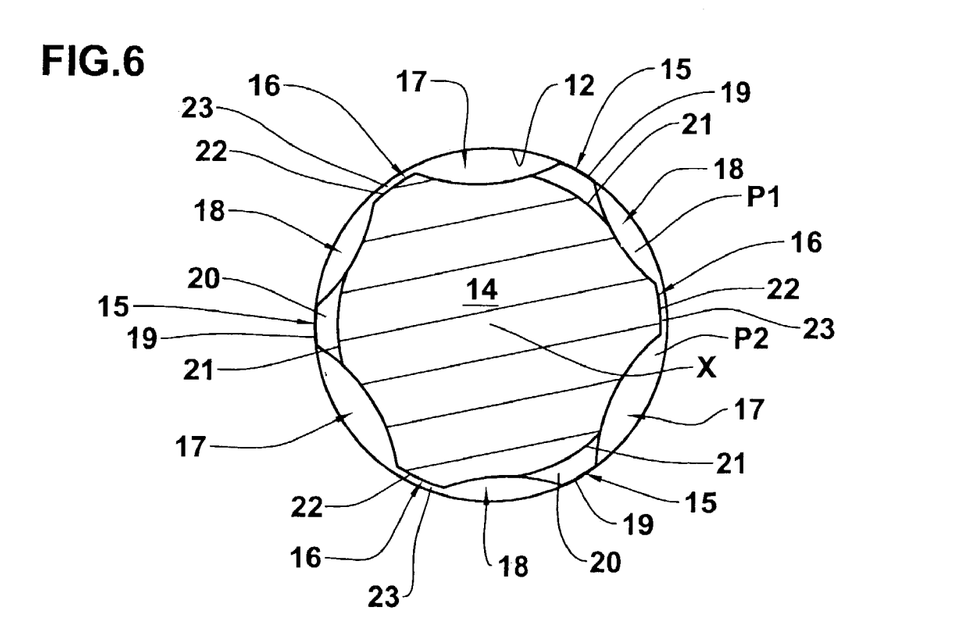
FIG. 6 is a cross-sectional view of the device in accordance with the present invention, taken along line VI—VI in FIG. 1.

With reference to FIG. 4 representing the outlet cross-section of the first portion 24 and to FIG. 5 representing the inlet cross-section of the second portion 25 close to the outlet cross-section of the first portion 24, it is possible to see that the crests of the primary 15 and secondary 16 threads have mutually reversed positions.

In the transition section from each portion 24, 25, 26 to the subsequent one, each thread has a step due to the different height of the primary threads 15 relative to the secondary threads 16.

The bottom of each primary flow channel 17 of the second portion 25 is on the contrary preferably connected to the bottom of the respective secondary flow channel 18 of the first and third portions 24, 26 and the bottom of each secondary flow channel 18 of the second portion 25 is in turn connected with the bottom of the respective primary flow channel 17 of the first and third portions 24, 26. In other words, the bottom diameters of each pair of mutually facing channels, at the passage section from one portion to the subsequent one, are of the same value.

In addition, as shown in the accompanying drawings, the first 24 and third 26 portions are preferably provided to be of identical structure.

The device shown has therefore six main paths extending along axis X from the inlet end 14a to the outlet end 14b of the cylindrical body 14. Each of these paths is formed of one primary-channel stretch and two secondary-channel stretches or of two primary-channel stretches and one secondary-channel stretch. In the accompanying FIG. 1 two of such paths $P_1$, $P_2$ are partly visible. The first path $P_1$ is formed of one primary-channel stretch belonging to the first portion 24, one secondary-channel stretch belonging to the second portion 25 and one primary-channel stretch belonging to the third portion 26. The second path $P_2$ is formed of one secondary-channel stretch belonging to the first portion 24, one primary-channel stretch belonging to the second portion 25 and one secondary-channel stretch belonging to the third portion 26.

With reference to the preferred embodiment herein illustrated, during operation the plastic material in a fluid form although not conveniently homogeneous which comes from the fixed helical path 13 of screw 2 enters the primary 17 and secondary 18 channels of the first portion 24, at the inlet end 14a of the cylindrical body 14. The direction of the main motion component of the fluid mass entering channels 17, 18 is equal to the winding direction R of the thread 11 of the extrusion screw 2. The course of the primary and secondary channels, 17 and 18, that in the first portion 24 extend in the winding direction $V_1$ opposite to the winding direction R of the transportation thread 11 of the extrusion screw 2, has a tendency to restrain movement of the plastic material mass.

Part of the plastic material enters the primary channels 17 that initially have a greater depth, which depth however will subsequently decrease and, due to the progressive reduction in the passage section along the channel extension, the material is forced to exude or leak above the crests 22 of the secondary threads 16 disposed downstream of the primary channel 17 with respect to the rotation direction "ω" of screw 2, as well as through the communication grooves 20, located on the crests 19 of the primary threads 15 placed upstream of channel 17 with respect to the rotation direction "ω" of screw 2. The reduced passage section offered by grooves 20 causes an increase in the mass velocity capable of generating an important turbulence in the secondary channel 18 into which said grooves 20 open.

The mass coming out of the primary channels 17 flows into the secondary channels 18 circumferentially adjacent to the primary channels 17 and the cross-section of which increases towards the second portion 25 of the cylindrical body 14. Each secondary channel 18 receives material from the crest 22 of the adjacent secondary thread 16 in a plurality of directions and velocities, giving rise to an important mixing effect with the mass that is already flowing in the secondary channel 18 itself.

In particular, the grooves 20 of the primary threads 15 mainly cause a turbulent-mixing effect whereas the crests 22 of the secondary threads 16 mainly cause a shearing effect, intended as stretching and separation of the polymeric structures composing each resin admitted to the extruder.

The plastic mass, on reaching the second portion 25, tends to increase its velocity as a whole, since channels 17, 18 into which the mass is introduced are in the same direction as the winding direction R of the thread 11 of screw 2.

In addition, each path $P_1$, $P_2$ at the second portion 25 in addition causes an effect on the plastic mass that is opposite to that produced in the first portion 24 because the secondary channels 18 continue their extension as the primary channels 17 and vice versa.

The plastic-mass motions are similar to those described above as regards the first portion but they are characterized by higher velocities. To compensate for the different motion components, it is preferably provided that in the second portion 25 each communication groove 20 should extend in a direction substantially perpendicular to the rotation axis of the substantially cylindrical body 14, instead of extending in a direction perpendicular to the primary thread 15, as in the first and third portions 24, 26.

Finally, in the third and last portion 26 there is again a change in the operational character of channels 17, 18 and a new tendency of the mass motions to slow down towards the outlet, since the channel orientation is opposite to the winding direction R of thread 11 on screw 2, as it happened for the first portion 24.

In conclusion, the fluid plastic material that runs through the mixing device 1 is shifted from a path $P_1$, $P_2$ to the other during its moving forward to the outlet opening 8 of extruder 5. The material flows that form the mass mutually cross and are subjected to velocity increases and decreases as well as to variations in the running direction of such a nature that the material is submitted to shearing, mixing and rolling operations.

The present invention achieves the intended purposes.

The innovative expedients proposed by the invention give rise to important improvements in terms of homogeneity of the material coming out of the extruder.

In fact, the device in accordance with the present invention enables the density of the material to be made uniform and mixing of the constituent resins to be optimized, through a reduction of the memory lattices of the polymers forming the resins themselves.

In addition, the device in reference enables the plasticization level of the material to be increased without resorting to an excessive temperature increase that could give rise to a physical/chemical decay of the material being worked.

Finally, adoption of the device in reference enables the residence time of the material in the extruder to be reduced and consequently productivity to be increased. For example, if the extruder is used in combination with an injection press, the device of the present invention allows reduction of the injection time.

It has also been found that the device in reference is substantially free of plastic-material stagnation on the surfaces and therefore enables an important reduction in the production times and manufacture rejections that become necessary for purging of the apparatus each time the type of plastic material being worked is to be replaced.

The invention claimed is:

1. A mixing device for extruders, comprising:
   a substantially cylindrical body to be terminally engaged with an extrusion screw having a shank and a transportation thread helically wound on the shank;
   at least one primary mixing thread helically wound at least partly around the substantially cylindrical body in a predetermined winding direction and having a predetermined crest diameter,
   said device further comprising at least one secondary mixing thread helically wound at least partly around the substantially cylindrical body in the same direction as said predetermined winding direction and having a crest diameter smaller than the crest diameter of the primary mixing thread;
   said at least one primary mixing thread delimiting at least one primary flow channel and at least one secondary flow channel that are substantially parallel;
   said at least one primary mixing thread further having at least one communication groove on its crest between the respective primary flow channel and the respective secondary flow channel;
   wherein said at least one secondary flow channel has an increasing depth from an inlet end to an outlet end of the substantially cylindrical body.

2. The device as claimed in claim 1, wherein said at least one primary flow channel has a decreasing depth from an inlet end to an outlet end of the substantially cylindrical body.

3. The device as claimed in claim 1, wherein said at least one primary flow channel is placed downstream of the respective primary mixing thread with respect to a predetermined rotation direction assigned to the cylindrical body.

4. The device as claimed in claim 1, wherein said at least one secondary flow channel is disposed upstream of the respective primary mixing thread with respect to a predetermined rotation direction assigned to the cylindrical body.

5. The device as claimed in claim 1, wherein said at least one communication groove extends in a direction substantially perpendicular to the extension of the crest of the primary mixing thread.

6. The device as claimed in claim 1, wherein said at least one communication groove has a depth of smaller amount than the depth of the primary and secondary flow channels.

7. The device as claimed in claim 1, wherein the primary mixing thread has at least two communication grooves on its crest.

8. The device as claimed in claim 1, comprising at least two primary mixing threads and at least two secondary mixing threads wound around the substantially cylindrical body and disposed in an alternate sequence along the circumferential extension of said substantially cylindrical body.

9. The device as claimed in claim 1, wherein each of the primary and secondary threads is wound around the cylindrical body according to an arc subtending an angle included between 45° and 180° around a rotation axis of the cylindrical body.

10. The device as claimed in claim 1, wherein each of the primary and secondary threads is inclined to a plane orthogonal to the rotation axis of the cylindrical body at an angle included between 30° and 80°.

11. The device as claimed in claim 1, wherein the cylindrical body has a first portion and a second portion that are axially consecutive, the winding direction (V of said primary mixing thread and secondary mixing thread on the first portion being opposite to the winding direction of the primary mixing thread and secondary mixing thread on the second portion.

12. The device as claimed in claim 11, wherein in said second portion each communication groove extends in a direction substantially perpendicular to the rotation axis of the substantially cylindrical body.

13. The device as claimed in claim 11, wherein the cylindrical body further has a third portion axially consecutive to the second portion, the winding direction (V of said primary mixing thread and secondary mixing thread on the third portion being opposite to the winding direction of the primary mixing thread and the secondary mixing thread on the second portion.

14. The device as claimed in claim 11, wherein each primary mixing thread on the second portion is terminally joined to a respective secondary mixing thread on the first portion.

15. The device as claimed in claim 11, wherein each primary flow channel in the second portion terminally joins a respective secondary flow channel in the first portion.

16. The device as claimed in claim 11, wherein each portion 4, 25, 2 of the cylindrical body has an axial length included between 0.5 and 1.5 times the crest diameter of the primary mixing thread.

17. The device as claimed in claim 1, wherein said at least one primary flow channel and said at least one secondary flow channel show, seen in cross-section, an arched-profile shape.

18. An extrusion screw comprising a shank and a transportation thread helically wound on the shank, which screw comprises a mixing device;
wherein the mixing device comprises:
    a substantially cylindrical body to be terminally engaged with an extrusion screw having a shank and a transportation thread helically wound on the shank;
    at least one primary mixing thread helically wound at least partly around the substantially cylindrical body in a predetermined winding direction and having a predetermined crest diameter,
said device further comprising at least one secondary mixing thread helically wound at least partly around the substantially cylindrical body in the same direction as said predetermined winding direction and having a crest diameter smaller than the crest diameter of the primary mixing thread;
said at least one primary mixing thread delimiting at least one primary flow channel and at least one secondary flow channel that are substantially parallel;
said at least one primary mixing thread further having at least one communication groove on its crest between the respective primary flow channel and the respective secondary flow channel;
wherein said at least one secondary flow channel has an increasing depth from an inlet end to an outlet end of the substantially cylindrical body.

19. The extrusion screw as claimed in claim 18, wherein each primary mixing thread of the mixing device has a crest diameter equal to a crest diameter of the transportation thread.

20. The extrusion screw as claimed in claim 18, wherein the winding direction of said at least one primary mixing thread and said at least one secondary mixing thread is opposite to the winding direction of the transportation thread.

21. An extruder comprising:
    a tubular body having an inlet opening and an outlet opening;
    an extrusion screw rotatably mounted within the tubular body;
    drive means to set the screw in rotation;
said extruder further comprising a mixing device;
wherein the mixing device comprises:
    a substantially cylindrical body to be terminally engaged with an extrusion screw having a shank and a transportation thread helically wound on the shank;
    at least one primary mixing thread helically wound at least partly around the substantially cylindrical body in a predetermined winding direction and having a predetermined crest diameter,
said device further comprising at least one secondary mixing thread helically wound at least partly around the substantially cylindrical body in the same direction as said predetermined winding direction and having a crest diameter smaller than the crest diameter of the primary mixing thread;
said at least one primary mixing thread delimiting at least one primary flow channel and at least one secondary flow channel that are substantially parallel;
said at least one primary mixing thread further having at least one communication groove on its crest between the respective primary flow channel and the respective secondary flow channel;
wherein said at least one secondary flow channel has an increasing depth from an inlet end to an outlet end of the substantially cylindrical body.

22. A mixing device for extruders, comprising:
    a substantially cylindrical body to be terminally engaged with an extrusion screw having a shank and a transportation thread helically wound on the shank;
    at least one primary mixing thread helically wound at least partly around the substantially cylindrical body in a predetermined winding direction and having a predetermined crest diameter,
said device further comprising at least one secondary mixing thread helically wound at least partly around the substantially cylindrical body in the same direction as said predetermined winding direction and having a crest diameter smaller than the crest diameter of the primary mixing thread;
said at least one primary mixing thread delimiting at least one primary flow channel and at least one secondary flow channel that are substantially parallel;
said at least one primary mixing thread further having at least one communication groove on its crest between the respective primary flow channel and the respective secondary flow channel;
wherein the device comprises at least two primary mixing threads and at least two secondary mixing threads wound around the substantially cylindrical body and disposed in an alternate sequence along the circumferential extension of said substantially cylindrical body.

23. The device as claimed in claim 22, wherein said at least one primary flow channel has a decreasing depth from an inlet end to an outlet end of the substantially cylindrical body.

24. The device as claimed in claim 22, wherein said at least one primary flow channel is placed downstream of the respective primary mixing thread with respect to a predetermined rotation direction assigned to the cylindrical body.

25. The device as claimed in claim 22, wherein said at least one secondary flow channel is disposed upstream of the respective primary mixing thread with respect to a predetermined rotation direction assigned to the cylindrical body.

26. The device as claimed in claim 22, wherein said at least one communication groove extends in a direction substantially perpendicular to the extension of the crest of the primary mixing thread.

27. The device as claimed in claim 22, wherein said at least one communication groove has a depth of smaller amount than the depth of the primary and secondary flow channels.

28. The device as claimed in claim 22, wherein the primary mixing thread has at least two communication grooves on its crest.

29. The device as claimed in claim 22, wherein each of the primary and secondary threads is wound around the cylindrical body according to an arc subtending an angle included between 45° and 180° around a rotation axis of the cylindrical body.

30. The device as claimed in claim 22, wherein each of the primary and secondary threads is inclined to a plane orthogonal to the rotation axis of the cylindrical body at an angle included between 30° and 80°.

31. The device as claimed in claim 22, wherein the cylindrical body has a first portion and a second portion that are axially consecutive, the winding direction of said primary mixing thread and secondary mixing thread on the first portion being opposite to the winding direction of the primary mixing thread and secondary mixing thread on the second portion.

32. The device as claimed in claim 31, wherein in said second portion each communication groove extends in a direction substantially perpendicular to the rotation axis of the substantially cylindrical body.

33. The device as claimed in claim 31, wherein the cylindrical body further has a third portion axially consecutive to the second portion, the winding direction of said primary mixing thread and secondary mixing thread on the third portion being opposite to the winding direction of the primary mixing thread and the secondary mixing thread on the second portion.

34. The device as claimed in claim 31, wherein each primary mixing thread on the second portion is terminally joined to a respective secondary mixing thread on the first portion.

35. The device as claimed in claim 31, wherein each primary flow channel in the second portion terminally joins a respective secondary flow channel in the first portion.

36. The device as claimed in claim 31, wherein each portion of the cylindrical body has an axial length included between 0.5 and 1.5 times the crest diameter of the primary mixing thread.

37. The device as claimed in claim 22, wherein said at least one primary flow channel and said at least one secondary flow channel show, seen in cross-section, an arched-profile shape.

38. An extrusion screw comprising a shank and a transportation thread helically wound on the shank, which screw comprises a mixing device;
wherein the mixing device comprises:
a substantially cylindrical body to be terminally engaged with an extrusion screw having a shank and a transportation thread helically wound on the shank;
at least one primary mixing thread helically wound at least partly around the substantially cylindrical body in a predetermined winding direction and having a predetermined crest diameter,
said device further comprising at least one secondary mixing thread helically wound at least partly around the substantially cylindrical body in the same direction as said predetermined winding direction and having a crest diameter smaller than the crest diameter of the primary mixing thread;
said at least one primary mixing thread delimiting at least one primary flow channel and at least one secondary flow channel that are substantially parallel;
said at least one primary mixing thread further having at least one communication groove on its crest between the respective primary flow channel and the respective secondary flow channel;
wherein the device comprises at least two primary mixing threads and at least two secondary mixing threads wound around the substantially cylindrical body and disposed in an alternate sequence along the circumferential extension of said substantially cylindrical body.

39. The extrusion screw as claimed in claim 38, wherein each primary mixing thread of the mixing device has a crest diameter equal to a crest diameter of the transportation thread.

40. The extrusion screw as claimed in claim 38, wherein the winding direction of said at least one primary mixing thread and said at least one secondary mixing thread is opposite to the winding direction of the transportation thread.

41. An extruder comprising:
a tubular body having an inlet opening and an outlet opening;
an extrusion screw rotatably mounted within the tubular body;
drive means to set the screw in rotation;
said extruder further comprising a mixing device;
wherein the mixing device comprises:
a substantially cylindrical body to be terminally engaged with an extrusion screw having a shank and a transportation thread helically wound on the shank;
at least one primary mixing thread helically wound at least partly around the substantially cylindrical body in a predetermined winding direction and having a predetermined crest diameter,
said device further comprising at least one secondary mixing thread helically wound at least partly around the substantially cylindrical body in the same direction as said predetermined winding direction and having a crest diameter smaller than the crest diameter of the primary mixing thread;
said at least one primary mixing thread delimiting at least one primary flow channel and at least one secondary flow channel that are substantially parallel;
said at least one primary mixing thread further having at least one communication groove on its crest between the respective primary flow channel and the respective secondary flow channel;
wherein the device comprises at least two primary mixing threads and at least two secondary mixing threads wound around the substantially cylindrical body and disposed in an alternate sequence along the circumferential extension of said substantially cylindrical body.

42. A mixing device for extruders, comprising:
a substantially cylindrical body to be terminally engaged with an extrusion screw having a shank and a transportation thread helically wound on the shank;

at least one primary mixing thread helically wound at least partly around the substantially cylindrical body in a predetermined winding direction and having a predetermined crest diameter, said device further comprising at least one secondary mixing thread helically wound at least partly around the substantially cylindrical body in the same direction as said predetermined winding direction and having a crest diameter smaller than the crest diameter of the primary mixing thread;

said at least one primary mixing thread delimiting at least one primary flow channel and at least one secondary flow channel that are substantially parallel;

said at least one primary mixing thread further having at least one communication groove on its crest between the respective primary flow channel and the respective secondary flow channel;

wherein the cylindrical body has a first portion and a second portion that are axially consecutive, the winding direction of said primary mixing thread and secondary mixing thread on the first portion being opposite to the winding direction of the primary mixing thread and secondary mixing thread on the second portion.

43. The device as claimed in claim 42, wherein said at least one primary flow channel has a decreasing depth from an inlet end to an outlet end of the substantially cylindrical body.

44. The device as claimed in claim 42, wherein said at least one primary flow channel is placed downstream of the respective primary mixing thread with respect to a predetermined rotation direction assigned to the cylindrical body.

45. The device as claimed in claim 42, wherein said at least one secondary flow channel is disposed upstream of the respective primary mixing thread with respect to a predetermined rotation direction assigned to the cylindrical body.

46. The device as claimed in claim 42, wherein said at least one communication groove extends in a direction substantially perpendicular to the extension of the crest of the primary mixing thread.

47. The device as claimed in claim 42, wherein said at least one communication groove has a depth of smaller amount than the depth of the primary and secondary flow channels.

48. The device as claimed in claim 42, wherein the primary mixing thread has at least two communication grooves on its crest.

49. The device as claimed in claim 42, wherein each of the primary and secondary threads is wound around the cylindrical body according to an arc subtending an angle included between 45° and 180° around a rotation axis of the cylindrical body.

50. The device as claimed in claim 42, wherein each of the primary and secondary threads is inclined to a plane orthogonal to the rotation axis of the cylindrical body at an angle included between 30° and 80°.

51. The device as claimed in claim 42, wherein in said second portion each communication groove extends in a direction substantially perpendicular to the rotation axis of the substantially cylindrical body.

52. The device as claimed in claim 42, wherein the cylindrical body further has a third portion axially consecutive to the second portion, the winding direction of said primary mixing thread and secondary mixing thread on the third portion being opposite to the winding direction of the primary mixing thread and the secondary mixing thread on the second portion.

53. The device as claimed in claim 42, wherein each primary mixing thread on the second portion is terminally joined to a respective secondary mixing thread on the first portion.

54. The device as claimed in claim 42, wherein each primary flow channel in the second portion terminally joins a respective secondary flow channel in the first portion.

55. The device as claimed in claim 42, wherein each portion 4, 25, 2 of the cylindrical body has an axial length included between 0.5 and 1.5 times the crest diameter of the primary mixing thread.

56. The device as claimed in claim 42, wherein said at least one primary flow channel and said at least one secondary flow channel show, seen in cross-section, an arched-profile shape.

57. An extrusion screw comprising a shank and a transportation thread helically wound on the shank, which screw comprises a mixing device;

wherein the mixing device comprises:
 a substantially cylindrical body to be terminally engaged with an extrusion screw having a shank and a transportation thread helically wound on the shank;
 at least one primary mixing thread helically wound at least partly around the substantially cylindrical body in a predetermined winding direction and having a predetermined crest diameter, said device further comprising at least one secondary mixing thread helically wound at least partly around the substantially cylindrical body in the same direction as said predetermined winding direction and having a crest diameter smaller than the crest diameter of the primary mixing thread;

said at least one primary mixing thread delimiting at least one primary flow channel and at least one secondary flow channel that are substantially parallel;

said at least one primary mixing thread further having at least one communication groove on its crest between the respective primary flow channel and the respective secondary flow channel;

wherein the cylindrical body has a first portion and a second portion that are axially consecutive, the winding direction of said primary mixing thread and secondary mixing thread on the first portion being opposite to the winding direction of the primary mixing thread and secondary mixing thread on the second portion.

58. The extrusion screw as claimed in claim 57, wherein each primary mixing thread of the mixing device has a crest diameter equal to a crest diameter of the transportation thread.

59. The extrusion screw as claimed in claim 57, wherein the winding direction of said at least one primary mixing thread and said at least one secondary mixing thread is opposite to the winding direction of the transportation thread.

60. An extruder comprising:
 a tubular body having an inlet opening and an outlet opening;
 an extrusion screw rotatably mounted within the tubular body;
 drive means to set the screw in rotation;
said extruder further comprising a mixing device;
wherein the mixing device comprises:
 a substantially cylindrical body to be terminally engaged with an extrusion screw having a shank and a transportation thread helically wound on the shank;

at least one primary mixing thread helically wound at least partly around the substantially cylindrical body in a predetermined winding direction and having a predetermined crest diameter, said device further comprising at least one secondary mixing thread helically wound at least partly around the substantially cylindrical body in the same direction as said predetermined winding direction and having a crest diameter smaller than the crest diameter of the primary mixing thread;

said at least one primary mixing thread delimiting at least one primary flow channel and at least one secondary flow channel that are substantially parallel;

said at least one primary mixing thread further having at least one communication groove on its crest between the respective primary flow channel and the respective secondary flow channel;

wherein the cylindrical body has a first portion and a second portion that are axially consecutive, the winding direction of said primary mixing thread and secondary mixing thread on the first portion being opposite to the winding direction of the primary mixing thread and secondary mixing thread on the second portion.

61. A mixing device for extruders, comprising:
a substantially cylindrical body to be terminally engaged with an extrusion screw having a shank and a transportation thread helically wound on the shank;
at least one primary mixing thread helically wound at least partly around the substantially cylindrical body in a predetermined winding direction and having a predetermined crest diameter, said device further comprising at least one secondary mixing thread helically wound at least partly around the substantially cylindrical body in the same direction as said predetermined winding direction and having a crest diameter smaller than the crest diameter of the primary mixing thread;

said at least one primary mixing thread delimiting at least one primary flow channel and at least one secondary flow channel that are substantially parallel;

said at least one primary mixing thread further having at least one communication groove on its crest between the respective primary flow channel and the respective secondary flow channel;

wherein said at least one primary flow channel and said at least one secondary flow channel show, seen in cross-section, an arched-profile shape.

62. The device as claimed in claim 61, wherein said at least one primary flow channel has a decreasing depth from an inlet end to an outlet end of the substantially cylindrical body.

63. The device as claimed in claim 61, wherein said at least one primary flow channel is placed downstream of the respective primary mixing thread with respect to a predetermined rotation direction assigned to the cylindrical body.

64. The device as claimed in claim 61, wherein said at least one secondary flow channel is disposed upstream of the respective primary mixing thread with respect to a predetermined rotation direction assigned to the cylindrical body.

65. The device as claimed in claim 61, wherein said at least one communication groove extends in a direction substantially perpendicular to the extension of the crest of the primary mixing thread.

66. The device as claimed in claim 61, wherein said at least one communication groove has a depth of smaller amount than the depth of the primary and secondary flow channels.

67. The device as claimed in claim 61, wherein the primary mixing thread has at least two communication grooves on its crest.

68. The device as claimed in claim 61, wherein each of the primary and secondary threads is wound around the cylindrical body according to an arc subtending an angle included between 45° and 180° around a rotation axis of the cylindrical body.

69. The device as claimed in claim 61, wherein each of the primary and secondary threads is inclined to a plane orthogonal to the rotation axis of the cylindrical body at an angle included between 30° and 80°.

70. The device as claimed in claim 61, wherein the cylindrical body has a first portion and a second portion that are axially consecutive, the winding direction of said primary mixing thread and secondary mixing thread on the first portion being opposite to the winding direction of the primary mixing thread and secondary mixing thread on the second portion; wherein in said second portion each communication groove extends in a direction substantially perpendicular to the rotation axis of the substantially cylindrical body.

71. The device as claimed in claim 61, wherein the cylindrical body has a first portion and a second portion that are axially consecutive, the winding direction of said primary mixing thread and secondary mixing thread on the first portion being opposite to the winding direction of the primary mixing thread and secondary mixing thread on the second portion; wherein the cylindrical body further has a third portion axially consecutive to the second portion, the winding direction of said primary mixing thread and secondary mixing thread on the third portion being opposite to the winding direction of the primary mixing thread and the secondary mixing thread on the second portion.

72. The device as claimed in claim 61, wherein the cylindrical body has a first portion and a second portion that are axially consecutive, the winding direction of said primary mixing thread and secondary mixing thread on the first portion being opposite to the winding direction of the primary mixing thread and secondary mixing thread on the second portion; wherein each primary mixing thread on the second portion is terminally joined to a respective secondary mixing thread on the first portion.

73. The device as claimed in claim 61, wherein the cylindrical body has a first portion and a second portion that are axially consecutive, the winding direction of said primary mixing thread and secondary mixing thread on the first portion being opposite to the winding direction of the primary mixing thread and secondary mixing thread on the second portion; wherein each primary flow channel in the second portion terminally joins a respective secondary flow channel in the first portion.

74. The device as claimed in claim 61, wherein the cylindrical body has a first portion and a second portion that are axially consecutive, the winding direction of said primary mixing thread and secondary mixing thread on the first portion being opposite to the winding direction of the primary mixing thread and secondary mixing thread on the second portion; wherein each portion 4, 25, 2 of the cylindrical body has an axial length included between 0.5 and 1.5 times the crest diameter of the primary mixing thread.

75. An extrusion screw comprising a shank and a transportation thread helically wound on the shank, which screw comprises a mixing device;
wherein the mixing device comprises:

a substantially cylindrical body to be terminally engaged with an extrusion screw having a shank and a transportation thread helically wound on the shank;

at least one primary mixing thread helically wound at least partly around the substantially cylindrical body in a predetermined winding direction and having a predetermined crest diameter, said device further comprising at least one secondary mixing thread helically wound at least partly around the substantially cylindrical body in the same direction as said predetermined winding direction and having a crest diameter smaller than the crest diameter of the primary mixing thread;

said at least one primary mixing thread delimiting at least one primary flow channel and at least one secondary flow channel that are substantially parallel;

said at least one primary mixing thread further having at least one communication groove on its crest between the respective primary flow channel and the respective secondary flow channel;

wherein said at least one primary flow channel and said at least one secondary flow channel show, seen in cross-section, an arched-profile shape.

76. The extrusion screw as claimed in claim 75, wherein each primary mixing thread of the mixing device has a crest diameter equal to a crest diameter of the transportation thread.

77. The extrusion screw as claimed in claim 75, wherein the winding direction of said at least one primary mixing thread and said at least one secondary mixing thread is opposite to the winding direction of the transportation thread.

78. An extruder comprising:

a tubular body having an inlet opening and an outlet opening;

an extrusion screw rotatably mounted within the tubular body;

drive means to set the screw in rotation;

said extruder further comprising a mixing device;

wherein the mixing device comprises:

a substantially cylindrical body to be terminally engaged with an extrusion screw having a shank and a transportation thread helically wound on the shank;

at least one primary mixing thread helically wound at least partly around the substantially cylindrical body in a predetermined winding direction and having a predetermined crest diameter, said device further comprising at least one secondary mixing thread helically wound at least partly around the substantially cylindrical body in the same direction as said predetermined winding direction and having a crest diameter smaller than the crest diameter of the primary mixing thread;

said at least one primary mixing thread delimiting at least one primary flow channel and at least one secondary flow channel that are substantially parallel;

said at least one primary mixing thread further having at least one communication groove on its crest between the respective primary flow channel and the respective secondary flow channel;

wherein said at least one primary flow channel and said at least one secondary flow channel show, seen in cross-section, an arched-profile shape.

79. An extrusion screw comprising a shank and a transportation thread helically wound on the shank, which screw comprises a mixing device;

wherein the mixing device comprises:

a substantially cylindrical body to be terminally engaged with an extrusion screw having a shank and a transportation thread helically wound on the shank;

at least one primary mixing thread helically wound at least partly around the substantially cylindrical body in a predetermined winding direction and having a predetermined crest diameter, said device further comprising at least one secondary mixing thread helically wound at least partly around the substantially cylindrical body in the same direction as said predetermined winding direction and having a crest diameter smaller than the crest diameter of the primary mixing thread;

said at least one primary mixing thread delimiting at least one primary flow channel and at least one secondary flow channel that are substantially parallel;

said at least one primary mixing thread further having at least one communication groove on its crest between the respective primary flow channel and the respective secondary flow channel;

wherein the winding direction of said at least one primary mixing thread and said at least one secondary mixing thread is opposite to the winding direction of the transportation thread.

80. The extrusion screw as claimed in claim 79, wherein said at least one primary flow channel has a decreasing depth from an inlet end to an outlet end of the substantially cylindrical body.

81. The extrusion screw as claimed in claim 79, wherein said at least one primary flow channel is placed downstream of the respective primary mixing thread with respect to a predetermined rotation direction assigned to the cylindrical body.

82. The extrusion screw as claimed in claim 79, wherein said at least one secondary flow channel is disposed upstream of the respective primary mixing thread with respect to a predetermined rotation direction assigned to the cylindrical body.

83. The extrusion screw as claimed in claim 79, wherein said at least one communication groove extends in a direction substantially perpendicular to the extension of the crest of the primary mixing thread.

84. The extrusion screw as claimed in claim 79, wherein said at least one communication groove has a depth of smaller amount than the depth of the primary and secondary flow channels.

85. The extrusion screw as claimed in claim 79, wherein the primary mixing thread has at least two communication grooves on its crest.

86. The extrusion screw as claimed in claim 79, wherein each of the primary and secondary threads is wound around the cylindrical body according to an arc subtending an angle included between 45° and 180° around a rotation axis of the cylindrical body.

87. The extrusion screw as claimed in claim 79, wherein each of the primary and secondary threads is inclined to a plane orthogonal to the rotation axis of the cylindrical body at an angle included between 30° and 80°.

88. The extrusion screw as claimed in claim 79, wherein the cylindrical body has a first portion and a second portion that are axially consecutive, the winding direction of said primary mixing thread and secondary mixing thread on the first portion being opposite to the winding direction of the primary mixing thread and secondary mixing thread on the second portion; wherein in said second portion each communication groove extends in a direction substantially perpendicular to the rotation axis of the substantially cylindrical body.

89. The extrusion screw as claimed in claim 79, wherein the cylindrical body has a first portion and a second portion that are axially consecutive, the winding direction of said primary mixing thread and secondary mixing thread on the first portion being opposite to the winding direction of the primary mixing thread and secondary mixing thread on the second portion; wherein the cylindrical body further has a third portion axially consecutive to the second portion, the winding direction of said primary mixing thread and secondary mixing thread on the third portion being opposite to the winding direction of the primary mixing thread and the secondary mixing thread on the second portion.

90. The extrusion screw as claimed in claim 79, wherein the cylindrical body has a first portion and a second portion that are axially consecutive, the winding direction of said primary mixing thread and secondary mixing thread on the first portion being opposite to the winding direction of the primary mixing thread and secondary mixing thread on the second portion; wherein each primary mixing, thread on the second portion is terminally joined to a respective secondary mixing thread on the first portion.

91. The extrusion screw as claimed in claim 79, wherein the cylindrical body has a first portion and a second portion that are axially consecutive, the winding direction of said primary mixing thread and secondary mixing thread on the first portion being opposite to the winding direction of the primary mixing thread and secondary mixing thread on the second portion; wherein each primary flow channel in the second portion terminally joins a respective secondary flow channel in the first portion.

92. The extrusion screw as claimed in claim 79, wherein the cylindrical body has a first portion and a second portion that are axially consecutive, the winding direction of said primary mixing thread and secondary mixing thread on the first portion being opposite to the winding direction of the primary mixing thread and secondary mixing thread on the second portion; wherein each portion of the cylindrical body has an axial length included between 0.5 and 1.5 times the crest diameter of the primary mixing thread.

93. The extrusion screw as claimed in claim 79, wherein each primary mixing thread of the mixing device has a crest diameter equal to a crest diameter of the transportation thread.

94. An extruder comprising:
a tubular body having an inlet opening and an outlet opening;
an extrusion screw rotatably mounted within the tubular body and comprising a shank and a transportation thread helically wound on the shank, which screw comprises a mixing device;
drive means to set the screw in rotation;
wherein the mixing device comprises:
a substantially cylindrical body to be terminally engaged with an extrusion screw having a shank and a transportation thread helically wound on the shank;
at least one primary mixing thread helically wound at least partly around the substantially cylindrical body in a predetermined winding direction and having a predetermined crest diameter;
said device further comprising at least one secondary mixing thread helically wound at least partly around the substantially cylindrical body in the same direction as said predetermined winding direction and having a crest diameter smaller than the crest diameter of the primary mixing thread;
said at least one primary mixing thread delimiting at least one primary flow channel and at least one secondary flow channel that are substantially parallel;
said at least one primary mixing thread further having at least one communication groove on its crest between the respective primary flow channel and the respective secondary flow channel;
wherein the winding direction of said at least one primary mixing thread and said at least one secondary mixing thread is opposite to the winding direction of the transportation thread.

* * * * *